Oct. 4, 1966    H. L. LAMBERT    3,276,766
METHOD AND APPARATUS FOR AUTOMATICALLY PRODUCING
TYPED LETTERS OR THE LIKE
Filed Dec. 28, 1964    5 Sheets-Sheet 1

INVENTOR
HARRY L. LAMBERT
Thomas L. Ross
BY James R. Black Jr.
ATTORNEYS

Oct. 4, 1966   H. L. LAMBERT   3,276,766
METHOD AND APPARATUS FOR AUTOMATICALLY PRODUCING
TYPED LETTERS OR THE LIKE
Filed Dec. 28, 1964   5 Sheets-Sheet 2
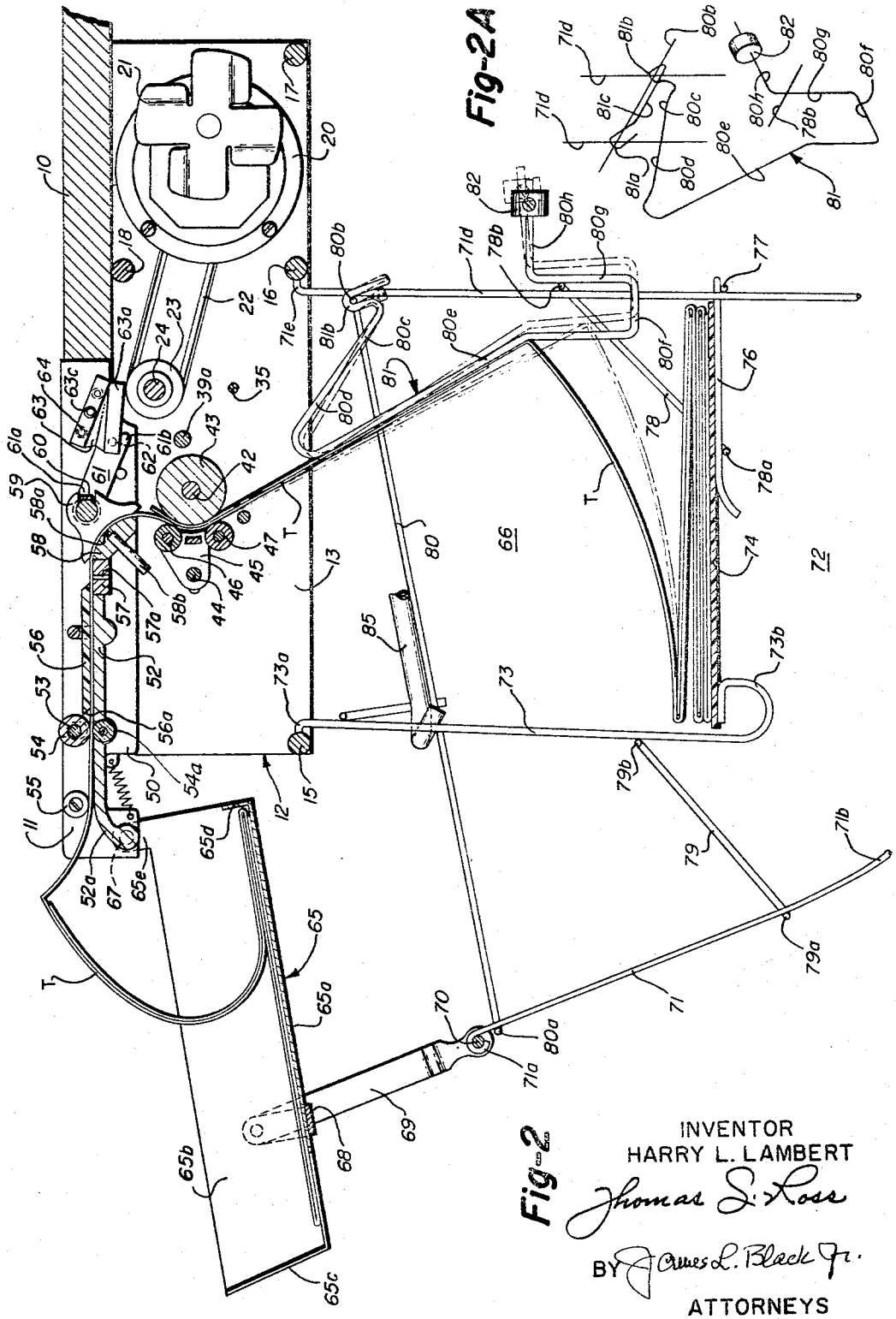
INVENTOR
HARRY L. LAMBERT
Thomas S. Ross
BY James L. Black Jr.
ATTORNEYS Oct. 4, 1966    H. L. LAMBERT    3,276,766
METHOD AND APPARATUS FOR AUTOMATICALLY PRODUCING
TYPED LETTERS OR THE LIKE
Filed Dec. 28, 1964    5 Sheets-Sheet 3

INVENTOR
HARRY L. LAMBERT
Thomas S. Ross
BY James L. Black Jr.
ATTORNEYS

Oct. 4, 1966 H. L. LAMBERT 3,276,766
METHOD AND APPARATUS FOR AUTOMATICALLY PRODUCING
TYPED LETTERS OR THE LIKE
Filed Dec. 28, 1964 5 Sheets-Sheet 4
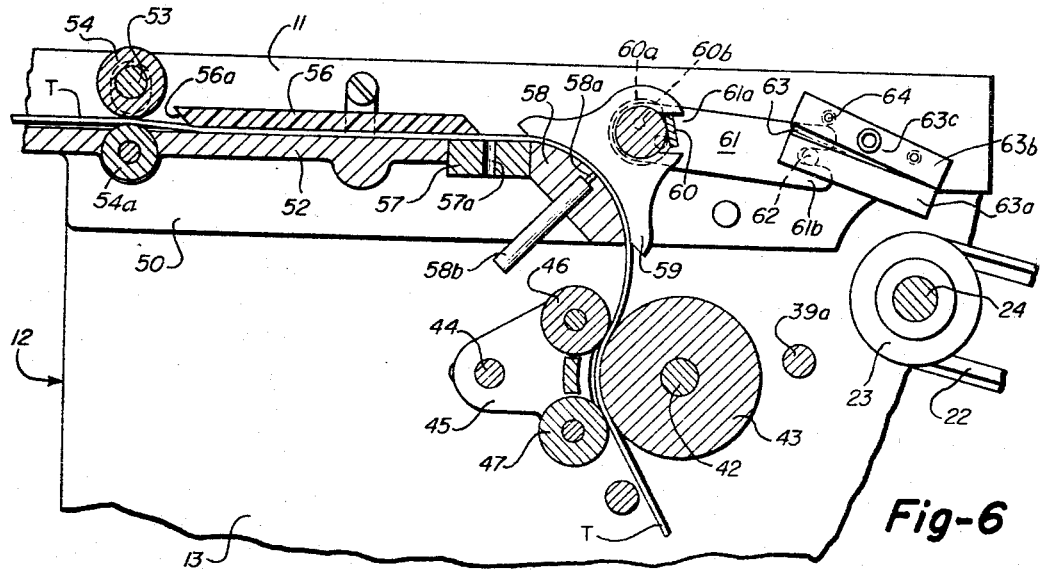
Fig-6
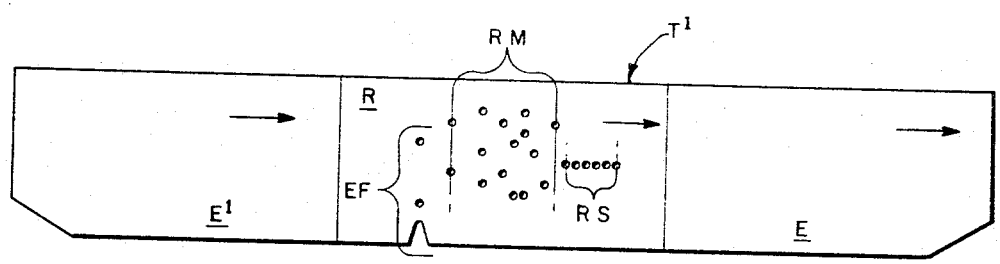
Fig-7
Fig-8
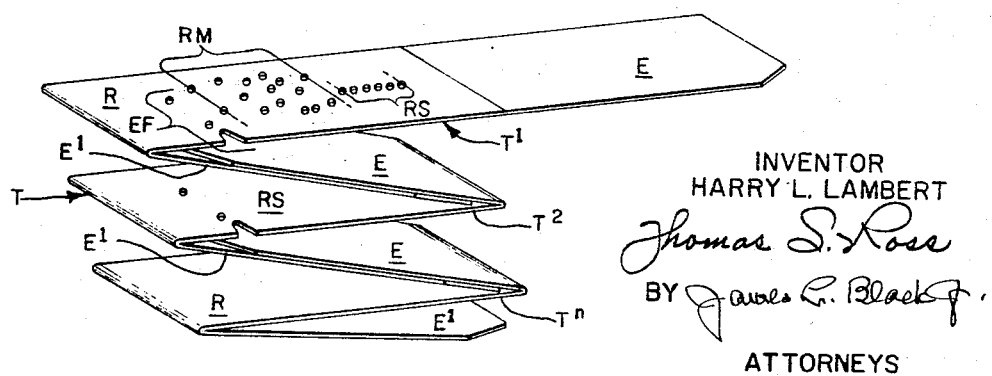
INVENTOR
HARRY L. LAMBERT
Thomas S. Ross
BY James C. Black
ATTORNEYS

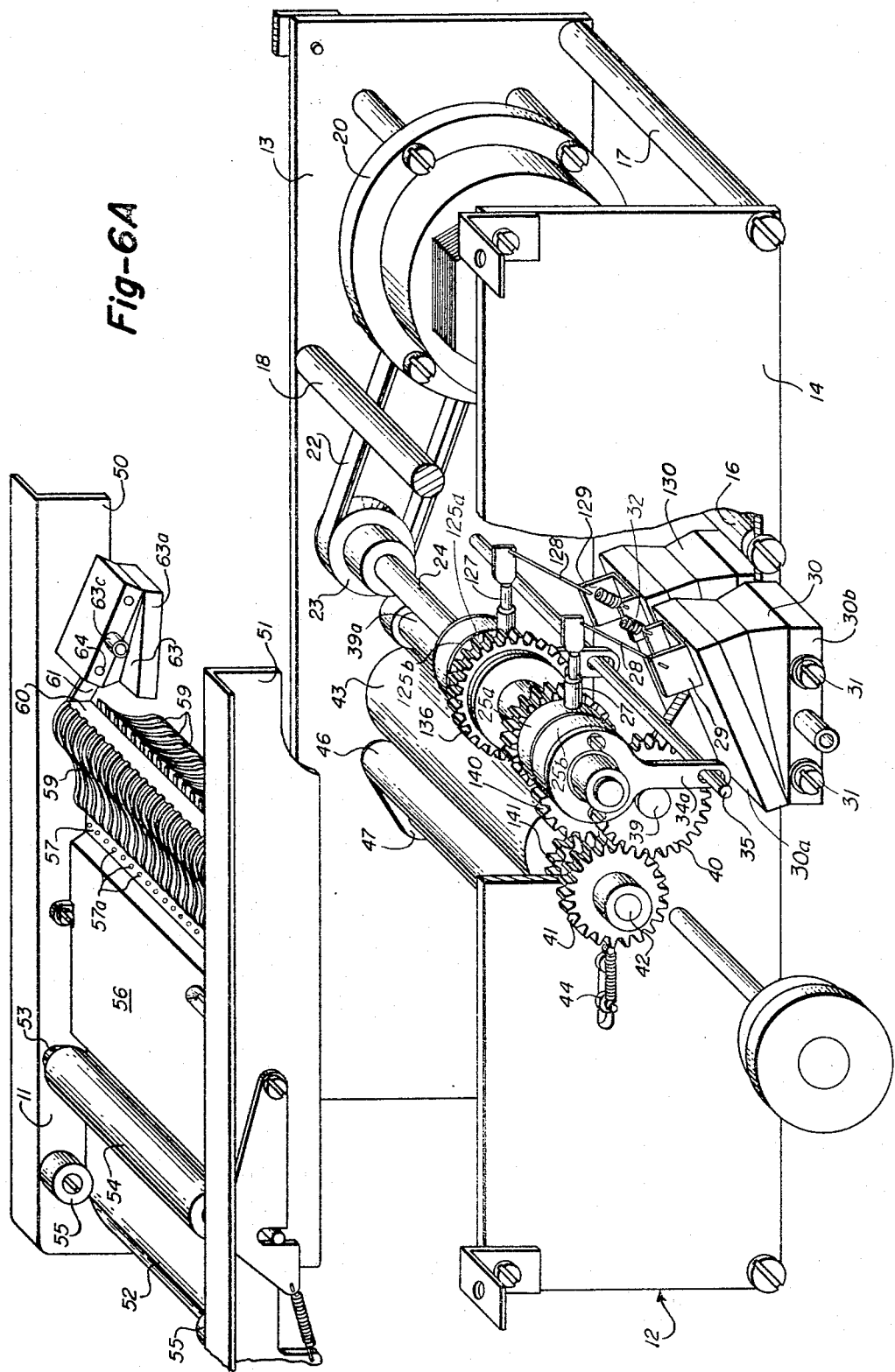

United States Patent Office 3,276,766
Patented Oct. 4, 1966

3,276,766
METHOD AND APPARATUS FOR AUTOMATICALLY PRODUCING TYPED LETTERS OR THE LIKE

Harry L. Lambert, Hendersonville, N.C., assignor, by mesne assignments, to Royal Typewriter Company, Inc., New York, N.Y., a corporation of Delaware
Filed Dec. 28, 1964, Ser. No. 421,541
8 Claims. (Cl. 270—39)

This invention relates to a method and means for automatically producing in any desirable quantity typed personalized letters or the like.

By way of exemplification, a manufacturer of proprietary products will solicit a large number of selling outlets or potential customers. Rather than sending a mimeographed or printed formal brochure to such prospective customers, the manufacturer can more effectively solicit sales by way of a dignified, personalized typed proffer on its letterhead. Obviously, where such solicitations amount to the hundreds or more, the cost of soliciting each customer by individually dictated letters would be prohibitive. Furthermore, it would overly tax the executive and his stenographer to originate individually such voluminous correspondence.

It is accordingly among the objects of this invention to provide both a method and means for initiating, storing for ready availability, and processing for transmission, pertinent data relevant to items for sale or to a specific wide spread request.

In accordance with my invention, I prepare a plurality of short tapes or tape links, of three or more sections each, each tape link bearing a code or number whereby the several tape links can be stored in a file so as to be readily removable in any sequence whatever for installation in a tape reader which controls an electric writing machine. For example, each tape link may comprise three sections, the first or leader being a fast feed-in section, the second or body section being appropriately code-punched for reader response, and the third or trailer a fast eject section. The three sections are fan-folded along lines defining the sections so that a number of selected tape links can be interleaved into what is hereinafter referred to as a chain tape that may be installed in a suitable hopper and continuously fed therefrom to a sensing station or reader which controls a writing machine such as the well known Royaltyper. The fanfold is such that, when successive tape links are interleaved, the trailer section of the leading tape link underlies and registers with the leader section of the succeeding tape link thus forming the chain tape that is fed into the reader mechanism which translates the codes punched into the tape links and by way of pneumatic circuitry appropriately signals the writing machine.

By way of example, a sporting goods store will be assumed to have five hundred more or less regular customers whose names and addresses are on file in the store. It is further assumed that as its principal major regular items the store stocks:

(1) Rifles
(2) Shotguns
(3) Fishing rods
(4) Canoes
(5) Boats
(6) Tents

To establish a tape file, in accordance with my invention, the message or body sections of five hundred tape links are punched to encode therein respectively the names and addresses of the five hundred customers. These tape links may bear successive numbers which relate to a master file so that any one or more desired tape links may be identified and readily retrieved from wherever they are serially filed. Next, the center of message sections of six tape links are punched to encode therein whatever information the proprietor of the store wants to transmit to his customers relating to the six categories referred to above. These tape links are appropriately cross-indexed to a master file and serially filed for convenient retrieval. Finally the center or message section of each of one or more tape links is punched to encode thereon a closing paragraph. If several different such paragraphs are desired they are appropriately cross-indexed to a master record and serially filed for easy retrieval.

Now assume that the proprietor wants letters relating to items (1) rifles, (2) shotguns, and (6) tents to be mailed to a selected one hundred of his customers. The machine operator may select from the file the first name and address tape link, next the three item tape links 1, 2 and 6, and then the closing paragraph tape link. The several tape links are then interleaved as described above, placed in the hopper of the tape reader and the leading section of the first tape link inserted into the feed mechanism of the reader and the reader started. The reader mechanism is such that the leading section of the first tape link will be rapidly fed until the first code hole in the body or message section is sensed. This causes the feed mechanism to slow down to typing speed; the message, i.e. the name and address, is then fed into the typewriter after which a code hole near the end of the message section causes the reader feed mechanism to feed the trailer section rapidly through the reader until the message section on the next tape link is sensed. This continues until the several tape links comprising the chain tape have been read and the letter completely typed at a speed and accuracy far beyond the capacity of an accomplished typist.

As the chain of interleaved tape links is fed out of the reader or from a sensing station it falls into a receiving hopper which is so devised that the tape links fold into precisely the same relationship as when originally placed in the reader hopper. Thus the operator merely has to interleave the next name and address tape link in place of the preceding one and the chain is in condition to be replaced in the reader hopper for the next letter to be typed. In similar manner the message tape links can be interchanged as required.

From the foregoing it will appear that my method of preparing accurate, high quality, high volume correspondence at low time and cost incidence is characterized additionally by unusual flexibility and adaptability that render it useful over a wide range of enterprises.

In the drawings wherein there is shown a preferred embodiment of the invention and wherein similar reference characters refer to similar parts throughout the several views:

FIGURE 2 is an enlarged fragmentary sectional elevation taken along a verticle plane passing substantially through the center of such mechanism and showing a chain-tape being fed therethrough, the chain-tape being shown in ejection posture;

FIGURE 2A is a fragmentary diagrammatic isometric view of a tape refolding pendulum;

FIGURE 6 is an enlarged fragmentary sectional elevation showing a portion of the upper part of the mechanism shown in FIGURE 2;

FIGURE 6A is an exploded partially broken away isometric view of the tape feed mechanism;

FIGURE 7 is a top plane view of a three section punched tape link showing the right or fast feed-in section, the left or fast eject section and the punched message or read center section;

FIGURE 8 is an isometric view of several interleaved tape links comprising a chain-tape.

Figure 1:
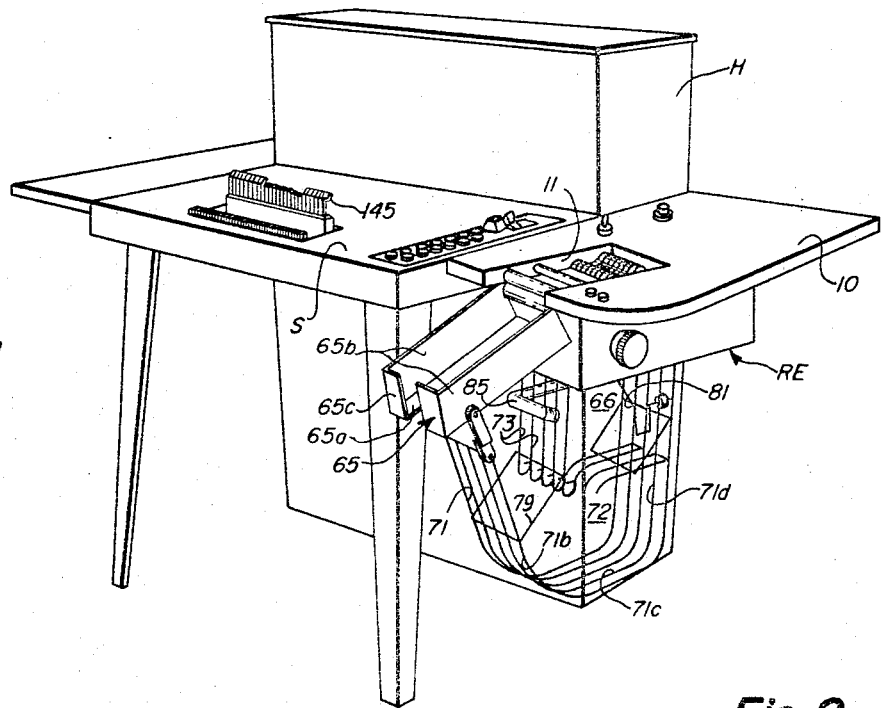
FIGURE 1 is a perspective view of a standard Royaltyper to which the read-eject mechanism embodying my invention is attached.

In FIGURE 1 there is shown a standard Royaltyper manufactured by applicant's assignee and comprising essentially three principal elements, namely a table or support S adapted to receive a typewriter (not shown), a housing H in which is disposed pneumatic circuitry such as that disclosed in U.S. Patent No. 3,228,509 to Griffin et al., incorporating valves such as those shown in U.S. Patents 2,894,614 and 3,127,746, and a reader-eject system RE which, according to my invention, is adapted to read and eject a continuous tape or chain tape T. By "continuous" is meant an elongated tape comprising a series of inseparable sections in contradistinction to the chain tape as shown in FIGURE 8. The mechanism shown in FIGURES 2–9 and described below comprises the reader-eject system RE (FIGURE 1) and as will appear has the capacity to handle both continuous and chain tape.

Figure 3:
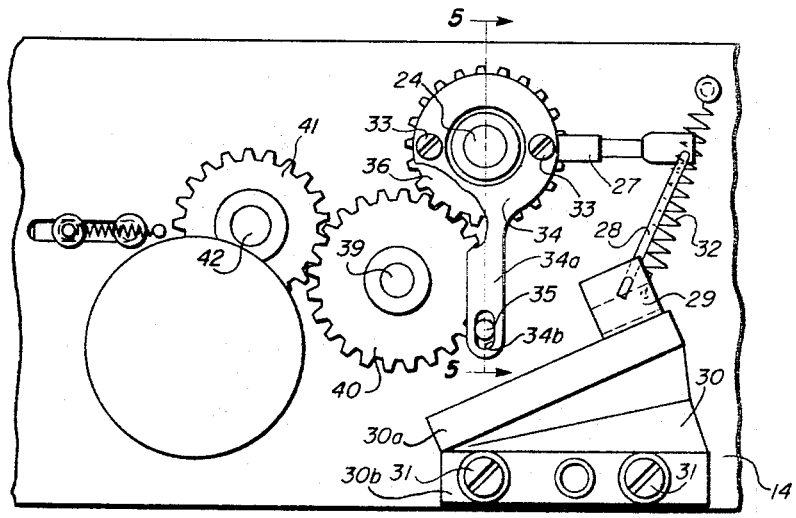
FIGURE 3 is an enlarged fragmentary elevation of the outside right side of the mechanism showing the low speed or read clutch and gear train to the feed roller.
Figure 4:
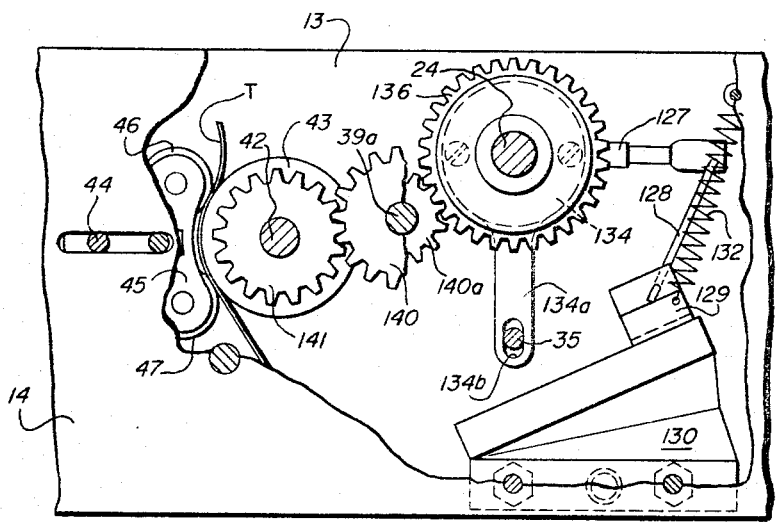
FIGURE 4 is an enlarged fragmentary sectional elevation of the inside of the right side of the mechanism showing the high speed or eject clutch and gear train to the feed roller.
Figure 5:
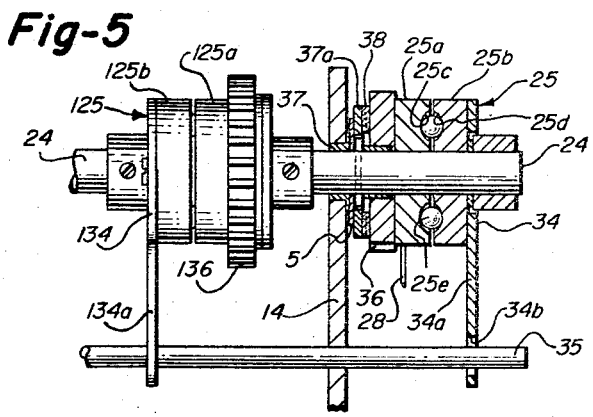
FIGURE 5 is a fragmentary sectional elevation taken along the line 5—5 of FIGURE 4 and showing details of the high speed clutch which is identical to the low speed clutch shown in FIGURE 3.

In my read-eject system (FIGURES 1 and 2) a table 10 is secured to housing H, is apertured at 11 to receive a tape reader assembly generally indicated at 12, through which tape T passes, and has secured thereto a pair of spaced vertical depending side plates 13 (FIGURES 2 and 6A) and 14 (FIGURES 3–5). Plate 13 is the lefthand plate while plate 14 is the righthand plate as viewed from the front of the machine, the lefthand side in FIGURE 2. These plates are secured to the opposite ends of rods 15, 16, 17 and 18 which hold the plates in properly spaced relation. Plate 13 (FIGURE 6A) carries a motor and reduction gear unit 20. The armature shaft of the motor has a fan 21 (FIGURE 2) attached thereto for cooling the motor. The output shaft (not shown) of the reduction gear unit carries a pulley (not shown) about which is trained a belt 22 adapted to drive a pulley 23 fastened to a drive shaft 24 (FIGURE 6) the opposite ends of which are journalled in side plates 13 and 14 respectively. Thus when the motor is "on," shaft 24 rotates constantly A pair of identical clutches (FIGURES 3, 4 and 5) generally indicated at 25 and 125 are mounted on drive shaft 24 on opposite sides of plate 14. Clutch 25 is shown in detail in FIGURE 5 and comprises a pair of elements 25a and 25b within which shaft 24 rotates freely. An arm 27 has one end connected to element 25a, the other end of this arm being connected to the upper end of a link 28, the lower end of which is connected to a bracket 29 fastened to the movable wall 30a of a bellows 30, the fixed wall 30b of the bellows being secured to side plate 14 by screws 31. Bellows 30 is hereinafter referred to as the read or low speed bellows. A spring 32 is fastened to plate 14 and bracket 29 to urge the bellows to expanded position and, via link 28 and arm 27, to urge element 25a to clutch disengaged position.

Clutch element 25b is secured as by screws 33 to a disc 34 having a depending arm 34a which is slotted at 34b to receive a retainer rod 35 which passes through side plate 14 and is received in the opposite side plate 13, this rod thus holding element 25b against rotation. The opposed inner faces of elements 25a and 25b are provided with cam grooves 25c and 25d within which are received a quota of balls 25e. These cam grooves are so arranged that when element 25a is rotated slightly in a clockwise direction (FIGURE 3) by collapse of bellows 30 the balls climb the cam surfaces of the grooves and force element 25a to the left (FIGURE 5).

A gear 36 is freely rotatably and axially slidably mounted in a bushing 37 which journals shaft 24 and slidably engages the left side of clutch element 25a. A friction disk 38 is secured to the left side of gear 36 and is adapted to engage a disc 37a when the clutch is engaged. The left hand face of disc 37a slidably engages a slip ring 5 which abuts bushing 37. It will now appear that when clutch element 25a is forced to the left, as described above, its left face binds with gears 36 thus forcing gear 36 to the left causing friction disc 38 to bind the disc 37a thereby coupling the gear to shaft 24 whereby the gear is driven.

A stud shaft 39 (FIGURE 3) is carried by side plate 14 and has an idler gear 40 rotatably mounted thereon in mesh with pinion 36. This gear also meshes with a gear 41 mounted on a shaft 42 which carries a tape feed roll 43 (FIGURES 2 and 6A). Clutch 25, being associated with the read or low speed bellows 30, will hereinafter be referred to as the read clutch. Thus when bellows 30 is collapsed to cause engagement of clutch 25, feed roll 43 is driven at low or read speed. Thus FIGURE 3 illustrates the low speed or read portion of the tape feed system.

The high speed or eject portion of the tape feed system is shown in FIGURES 4 and 6A and is substantially identical to that shown in FIGURE 3, the only principal difference lying in the gear train which connects the power shaft 24 to the feed roll shaft 42. Thus the FIGURE 4 system comprises a clutch 125, identical to clutch 25, an arm 127, a link 128, a bellows 130, a spring 132 and a gear 136, of greater diameter than pinion 36, all of which operate in the manner described above in connection with FIGURES 3 and 5. It should be noted that the FIGURE 4 portion of the system is disposed on the inside of side plate 14 whereas the FIGURE 3 portion lies outside of side plate 14. Gear 136 meshes with a small idler gear 140a mounted on a cross shaft 39a carried by side plates 13 and 14, another and larger idler gear 140 also being mounted on shaft 39a and meshing with gear 141 on feed roll shaft 42. Thus when eject clutch 125 is engaged by collapse of eject bellows 130, feed roll 43 is driven at eject or high speed via gear 136, idlers 140a and 140 and gear 141.

A cross shaft 44 (FIGURE 2) has its opposite ends mounted in side plates 13 and 14 and carries a pair of brackets such as bracket 45 adjacent the inner sides of the side plates respectively. These brackets rotatably support a pair of idler pressure rolls 46 and 47 and are adapted, together with roll 43, to grasp the tape T so that it will be fed in proper manner as roll 43 is driven at either read or eject feed.

The tape reader assembly 12 (FIGURES 2 and 6A) may comprise a pair of side bars 50 and 51 to which is secured a tape supporting table 52 having a downwardly curving entry end 52a. Downstream of end 52a, a transverse rod 53 has its ends mounted in bars 50 and 51 and rotatably supports a rubber-covered hand feed roller 54. Adjacent the top of entry end 52a are two guide collars, such as collar 55, fastened respectively to side bars 50 and 51, the bottoms of these collars being slightly spaced from the top of table 52 so as to receive the leading end of tape T and accordingly properly present it to roller 54.

A correction plate 56 spanning the space between side bars 50 and 51 and releasably secured thereto is disposed downstream of roller 54 and has an inclined entry edge 56a to facilitate the entry of the leading edge to tape T thereunder. A correction bar 57 provided with a number of holes 57a is located downstream of plate 56, its top being flush with the top of tape table 52. Downstream of and adjacent plate 56 is disposed a tracker bar 68 secured to and between plates 50 and 51 having a plurality of ports 58a (FIGURE 6) of the same number and in alignment with holes 57a in correction bar 57 and also having a plurality of pneumatic tube nipples such as 58b, 58c and 140. Overlying the tracker bar are a plurality of tension segments 59 having arcuate lower surfaces that conform to the curvature of the top surface of the tracker bar; these surfaces being separable to facilitate the passage of the double thickness of the chain tape during ejection as will be described more fully below. Also the opposed arcuate surfaces of the tracker bar and tension segments are so arranged that the leading end of a tape fed therethrough is guided to the nip between rolls 43 and 46. The tape is advanced to this point, i.e. the nip, by manually rotating roller 54 after the leading end of the tape has been fed under collars 55 to the nip between rollers 54 and 54a (FIGURES 2 and 6).

Tension segments 59 (FIGURE 6) are loosely mounted in slots 60a formed in a segment stop bar 60 rockably mounted on pins 60b secured to and extending inwardly from side plates 50 and 51. One end 61a of a link 61 is fastened to bar 60 while the other slotted end 61b thereof receives a pin 62 extending from the movable plate 63a of a bellows 63, the other plate 63b of which is adjustably secured to plate 50 by screws 64. Bellows 63 (FIGURE 6A) includes a nipple 63c to receive a pneumatic tube 150 comprising part of the pneumatic circuit shown in FIGURE 9 as will be described below. When a double thickness of the chain tape T approaches tension segments 59, code holes EF at the end of a message section will be sensed by tracker bar 58 and bellows 63 is caused to expand thus lifting the segments away from the top surface of the tracker bar to provide more clearance for easy passage of the double thickness tape between the tracker bar and tension segments. This occurs during high speed eject of the tape. After eject other codes RS at the beginning of the next message section of the chain tape will be sensed by the tracker bar causing bellows 63 to expand and return the tension segments to proper position for the passage of a single thickness section of the chain tape. This operation of the tension segments will be described in greater detail hereinbelow in connection with FIGURE 9.

The chain tape T (FIGURE 2) is initially disposed in a supply hopper generally indicated at 65 from which it is drawn by the mechanism described above and fed into a receiving hopper generally indicated at 66. Hopper 65 is preferably rectangular in horizontal cross section and comprises a bottom 65a, side walls 65b and end walls 65c and 65d. Resilient attaching ears 65e are secured to and extend upwardly from the inner ends of side walls 65b respectively adjacent end wall 65d and are provided with slots adapted to receive pins, such as pin 67, secured to and extending outwardly from side bars 50 and 51 whereby the inner end of hopper 65 may be releasably secured to the side bars. A U-shaped strap 68, is fastened to hopper sides 65b near the front end of the hopper and has links, such as link 69 pivotally connected thereto. The lower ends of links 69 are pivotally carried by a rod 70 mounted through the eyelet ends 71a of a plurality of downwardly extending chute forming wires such as wire 71 (see also FIGURE 1). Wire 71 (FIGURE 2) includes a rearwardly curving portion 71b, a substantially flat bottom portion 71c (FIGURE 1) and an upwardly extending vertical portion 71d having a bent over end 71e secured, as by welding to cross rod 16. Wire portions 71b, 71c and the lower ends of portions 71d comprise a sub-hopper 72 adapted to receive and have fed therefrom a fan-folded continuous tape (not shown) as used in the standard Royaltyper.

Hopper 66 comprises the upper portions 71d of wires 71 as a rear wall, a plurality of vertical wires, such as wire 73, forming a front wall—wires 73 each having a bent over end 73a welded to cross rod 15—and a preferably loosely mounted bottom plate 74. The lower end of each of wires 73 is bent into an eyelet 73b so that the several eyelets comprise a front support for plate 74. A plurality of horizontal wires, such as wire 76, are welded at their inner ends to a horizontal cross wire 77 welded to wire portions 71d. Thus wires 76 comprise a support for the rear end of hopper bottom 74. To brace wires 71 and 73, I provide a wire square 79 whose lower and upper transverse sections 79a and 79b are respectively welded to wires 71 and 73 and a wire rectangle 80 whose outer and inner transverse sections 80a and 80b are respectively welded to wires 71 and wire portions 71d.

The center portion of transverse wire section 80b (FIGURES 2 and 2B) provides a fulcrum for a freely rockable tape folding pendulum generally indicated at 81. This pendulum may be bent into the form shown in FIGURE 2A from a single piece of wire and comprises a pair of spaced eyelets 81a and 81b interconnected by a transverse section 81c and adapted to rockably suspend the pendulum from transverse wire section 80b. From eyelet 81b the wire is bent inwardly as at 80c and then upwardly to form a centrally disposed section 80d, then bent to form a downwardly and rearwardly extending section 80e. At the lower end of section 80e the wire is bent to form a U 80f, the upwardly extending leg 80g of which terminates at the forward end of a horizontal rearwardly extending section 80h which threadably carries an adjustable weight 82, the adjusted position of which determines the normal vertical posture of pendulum 81. As will more clearly appear hereinafter, pendulum 81 is provided to assure refanfolding of chain tape T as it is fed into hopper 66.

The details of chain tape T are shown in FIGURES 7 and 8. In FIGURE 7 there is shown one link $T^1$ of the tape while in FIGURE 8 there are shown a plurality of links $T^1$, $T^2$, $T^n$ which comprise a complete chain tape T as assembled in accordance with the information desired to be retrieved and typed. A typical link $T^1$ (FIGURE 7) may comprise three sections E, R and $E^1$, although any desired number of message sections R may be provided depending on the message to be typed. Sections E and $E^1$ are eject sections while section R is the read or message section having code holes punched therethrough which control not only the writing machine but also the tape feeding mechanism by way of tracker bar 58 and the FIGURE 9 pneumatic circuit. Thus tape section R may be punched to provide read holes RS which upon passage over the tracker bar effect low or read speed operation of the tape feed mechanism. The punched holes RM are the code holes that, as they serially pass over the tracker bar, effect actuation of the typewriter key bars to print the encoded message. The punched holes and notch EF, trailing the message holes RM effect, as they pass over the tracker bar, high or eject speed operation of the tape feed mechanism which continues until the tracker bar senses the read holes RS in the following link of the chain tape.

Figure 9:
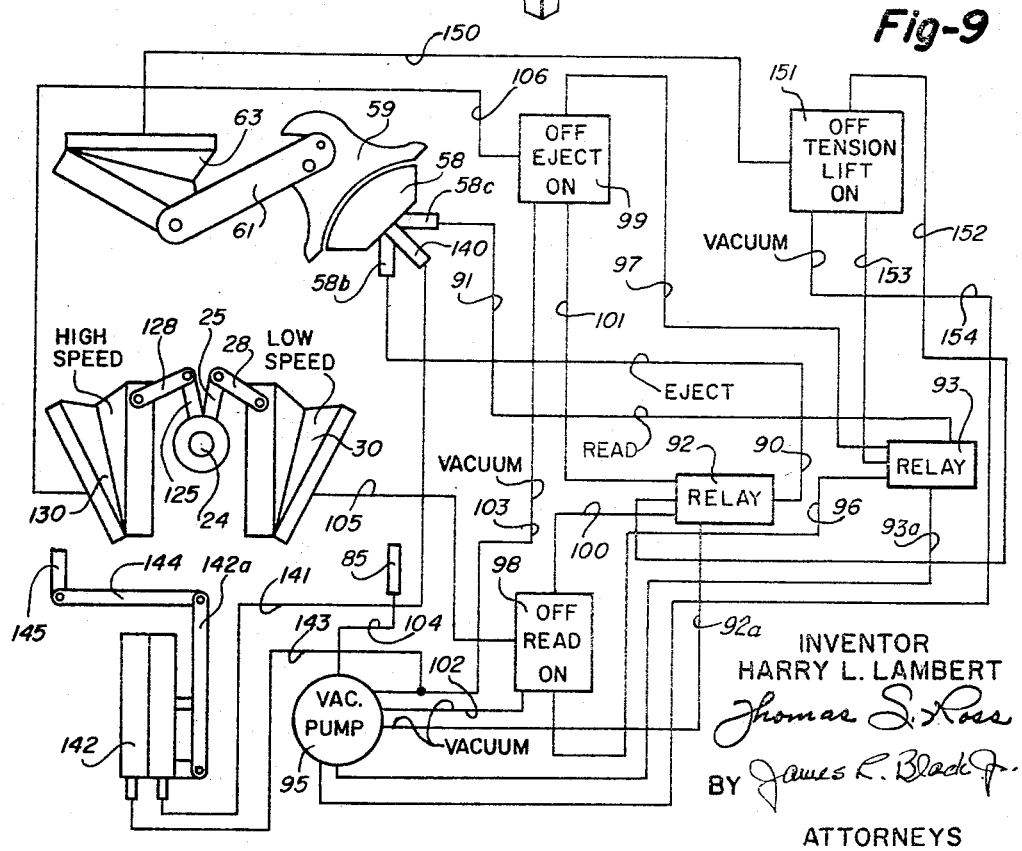
FIGURE 9 is a diagram of the pneumatic circuit comprising a portion of the mechanism.

As shown in FIGURE 8 the chain tape T comprises a plurality of take links $T^1$–$T^n$ wherein the eject section following section $E^1$ of link $T^1$ is interleaved below the leading eject section E of the following link $T^2$, etc. The unfolding action of the chain tape T is apparent as the chain is fed into the tape feeding mechanism from hopper 65 (FIGURE 2), i.e. each trailing eject section $E^1$ of a link lifts the eject section E of the following link upwardly thereby forming a bend in the tape before it is fed to and beneath collars 55, to and under roller 54, thence over tracker bar 58 under the tension of tension segments 59 and then downwardly to rolls 43–46–47 to hopper 66. A nozzle 85 which is connected to the exhaust side of a vacuum supply pump 95 shown in FIGURE 9 is located centrally of hopper 66 and directs a very light flow of air against the descending tape T to assist in the refolding thereof in the hopper after passage through the feed mechanism. It will now appear that as tape T is fed downwardly into hopper 66 it encounters the light flow or stream of air from nozzle 85 which forces the tape against pendulum 81 causing the pendulum to rock counterclockwise whereby the tape refolds fanwise in hopper 66 without any endwise separation of the individual tape links. In the absence of pendulum 81 and the flow of air from nozzle 85 the tape tends to buckle and frequently would not refold in proper fashion for refilling after the encoded data is retrieved.

The feed mechanism and tension lift bellows 63 described above is controlled by tracker bar 58 and the tubing diagram shown in FIGURE 9. Thus the tracker bar is connected at its nipples 58b and 58c to tubes 90 and 91 respectively which lead to relay or booster valves 92 and 93 respectively. Valve 92 is connected by a vacuum supply tube 92a to a vacuum supply pump 95 while valve 93 is connected to the pump by a tube 93a. In the absence of code holes in the tape passing over tracker bar 58, tubes 90 and 91 are under vacuum. Leading from relay valve 93 are three tubes 96, 97 and 153. Tube 96 is connected to the "on" side of an on-off read valve 98. Tube 97 is connected to the "off" side of an on-off eject valve 99, and tube 153 is connected to the "on" side of on-off valve 151. Leading from relay valve 92 are three tubes 100, 101 and 152. The tube 100 leads to the "off" side of on-off switch 98, tube 101 leads to the "on" side of on-off valve 99, and tube 152 leads to the on-off side of on-off valve 151. Pump 95 is connected to valves 98, 99 and 151 by vacuum supply lines 102, 103 and 154 respectively. Air from the exhaust side of pump 95 flows by way of a tube 104. On-off valve 98 is connected to read bellows 30 by a tube 105, on-off valve 99 is connected to eject bellows 130 by a tube 106 and on-off valve 151 is connected to bellows 63 by a tube 150. It may now be seen that when a control code hole RS (FIGURE 7) traverses tracker bar 58 (FIGURE 9) an atmospheric pulse is transmitted to relay valve 93 by way of tube 91 which is thereby operated in well known manner to transmit, as shown in FIGURE 9, three output pulses through tubes 96, 97 and 153 to the "on" side of on-off valve 98, the "off" side of on-off valve 99 and the "on" side of on-off valve 151 respectively. The pulse in tube 97 to on-off valve 99 operates the valve to shift the vacuum in the tube 106 to air causing bellows 130 to expand and accordingly disengage eject clutch 125 to terminate the eject or high speed operation of the tape feed mechanism. At the same time the pulse in tube 96 operates on-off valve 98 shifting the air in tube 105 from pressure to vacuum causing bellows 30 to collapse which engages read clutch 25 to effect read or low speed operation of the tape feed mechanism and at the same time the pulse in tube 153 operates on-off valve 151 shifting the air in tube 150 from air to vacuum causing bellows 63 to collapse and move tension segments 59 toward tracker bar 58 in the manner above described. When an eject code hole EF, in the tape traverses tracker bar 58, the reverse of the foregoing operation ensues, i.e. eject bellows 130 is collapsed to engage the high speed eject clutch 125, read bellows 30 is expanded to disengage the low speed read clutch 25 and bellows 63 is expanded to lift tension segments 59 upwardly relative to the tracker bar 58 to thereby accommodate double thickness tape sections.

Booster or relay valves 92 and 93 provided with three outputs may be similar to the booster valve shown in Figure 1 of U.S. Patent 2,932,375 while on-valves 98, 99 and 151 may be similar to the on-off valve shown in Figure 3 of U.S. Patent 3,127,746.

Tracker bar 58 is provided with another nipple 140 to which a tube 141 is connected leading to a pouch actuator valve 142. This valve may resemble that shown in Figure 6 of said U.S. Patent 2,894,614 and has a tube 143 connected thereto and to tube 103 and accordingly to pump 95 whereby valve 142 is normally connected to vacuum. Valve 142 includes an actuator arm 142a which is connected by a link 144 to a lever 145 which, upon actuation, operates the carriage return mechanism of the typewriter (not shown) mounted on support S (FIGURE 1). Thus, when a carriage return code hole punched in tape T traverses tracker bar 58, a pulse is transmitted to pouch actuator 142 causing its arm 142a to pivot and thereby operate lever 145 to effect carriage return operation of the typewriter.

Because of the double thickness of chain tape T where leading and trailing ejects sections E and $E^1$ of successive links are overlapped provision is made, as briefly described above, for lifting tension segments 59 away from tracker bar 58 to facilitate passage of the double tape thickness.

It may now be seen that I have provided a method and apparatus for attaining the several objects set forth above in a thoroughly practical and efficient manner.

The foregoing is to be interpreted as illustrative and not in a limiting sense, the scope of the invention being defined in the following claims.

I claim:

1. Apparatus for transporting and reading a fan-folded chain-like tape composed of a plurality of individual tape links each having unpunched leading and trailing sections and at least one intervening punched message section, the links being detachably held together in a lengthwise direction by overlapping said leading and trailing link sections, said apparatus comprising, in combination:
    (a) a tape supporting table,
    (b) a tape supply hopper mounted at one end of said table,
    (c) a tape reader mounted adjacent the other end of said table, said reader having an expandable gap or opening through which said tape is drawn,
    (d) a first feeding means to feed said tape over said table and into and through said reader gap,
        said hopper and supply table being so oriented as to form a bend in said chain-like tape whereby the trailing section of a first link lifts the leading section of a following link into engagement with said first feeding means thereby to prevent endwise separation of said tape links as they are transported from said supply hopper,
    (e) a second tape feeding means mounted below said reader,
    (f) a receiving hopper to receive said tape as it is fed thereto by said second tape feeding means, and
    (g) means controlled by punched information in said tape to enlarge or expand said reader gap to accommodate the overlapped sections of said tape and to reduce or contract said reader gap to accommodate the single thickness message sections of said tape.

2. Tape feeding and reading apparatus as recited in claim 1; additionally comprising means for driving said second tape feeding means at a first speed when transporting said punched message sections of the tape through said reader and at a second speed when transporting said unpunched overlapping sections of the tape through said reader.

3. Tape feeding and reading apparatus as recited in claim 2; wherein said first driving speed for said second tape feeding means is lower than said second driving speed therefore.

4. Tape feeding and reading apparatus as recited in claim 3; wherein said first and second driving speeds for said second tape feeding means are controlled by information in the punched message sections of said chain-like tape.

5. Tape feeding reading apparatus as recited in claim 2; wherein the means for driving said second tape feeding at two different speeds comprises:
    (a) a constantly rotating drive shaft,
    (b) a pair of gears freely mounted on said shaft,
    (c) clutch means for each of said gears,
    (d) driving connections between each of said gears and said second tape feeding means, and (e) means controlled by punched information in said tape for actuating one of said clutches to connect one of said gears with said second tape feeding means when the latter is feeding message sections of said tape and to actuate the other of said clutches to connect the other of said gears with said second tape feeding means when the latter is feeding overlapping sections of said tape.

6. Apparatus for transporting and reading a chain-like tape as recited in claim 1; additionally comprising means to expand or enlarge said reader gap when the overlapped leading and trailing sections of said tape pass through said gap and to contract or reduce said reader gap when the single thickness messge sections of said tape pass through said gap, said means comprising,
(a) a plurality of tension segment having arcuate lower surfaces,
(b) a tracker bar having a curved surface that conforms to the arcuate lower surfaces of said tension segments, and
(c) means including at least one supporting arm for said segments operable to move said segments toward and from the curved surface of said tracker bar under control of punched information in said chain-like tape.

7. The herein described method of forming a chain-like tape having a plurality of separably and selectively connected fan-folded links adapted to be unfolded and refolded without separating as the links are fed link serially past a sensing station whereby machine sensible coded information recorded therein may be serially sensed, comprising the steps of:
(a) forming a plurality of individual links having multi-sections of substantially equivalent predetermined length,
(b) serially recording machine sensible coded information within and along the length of the center sections of said multi-section links,
(c) fan-folding said links along the lines defining sections, and
(d) separably selectively connecting said individual fan-folded links by placing the trailing section of one link in underlying relationship to the leading section of a following fan-folded link.

8. A chain-like tape of the character described adapted to be fed link serially past a sensing station comprising the combination of:
a plurality of individual separably and selectively connectible tape links, each link comprising a leading section, a trailing section and at least one intervening message section or sections, said links being separably connectible by fan-folding along lines defining each section with the trailing section of one link underlying the leading section of a following link, all of said sections being of substantially equal length in the direction of tape travel and the lengths of said sections being such that the sections may unfold and refold without separation as the tape is fed, and
machine sensible coded information serially recorded within said message sections in the direction of travel of said tape, whereby as said fan-folded links are fed link serially said coded information is serially presented to a sensing station and said fan-folded links unfold and refold without separation of the links one from another.

References Cited by the Examiner
UNITED STATES PATENTS

| | | | |
|---|---|---|---|
| 1,756,392 | 4/1930 | Smith | 270—39 |
| 2,612,168 | 9/1952 | Stark | 129—16.5 |
| 2,729,445 | 1/1956 | Webster | 270—39 |
| 2,906,527 | 9/1959 | Blain | 270—52.5 X |
| 2,924,327 | 2/1960 | Heimel | 199—18 |
| 3,188,080 | 6/1695 | Kelliher | 270—52.5 X |

EUGENE R. CAPOZIO, *Primary Examiner.*

N. M. ELLISON, *Assistant Examiner.*